(12) United States Patent
Seshadri et al.

(10) Patent No.: US 7,877,121 B2
(45) Date of Patent: *Jan. 25, 2011

(54) MODULAR WIRELESS HEADSET AND/OR HEADPHONES

(75) Inventors: Nambirajan Seshadri, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 12/410,762

(22) Filed: Mar. 25, 2009

(65) Prior Publication Data

US 2009/0181731 A1   Jul. 16, 2009

Related U.S. Application Data

(63) Continuation of application No. 10/856,124, filed on May 28, 2004, now abandoned.

(60) Provisional application No. 60/473,675, filed on May 28, 2003.

(51) Int. Cl.
*H04M 1/00* (2006.01)

(52) U.S. Cl. .................. 455/575.2; 455/41.2; 455/74.1; 455/569.1; 455/575.6; 381/23.1; 381/74; 381/370; 379/430; 379/431

(58) Field of Classification Search ................ 455/3.05, 455/3.06, 41.2, 41.3, 66.1, 74, 74.1, 90.1–90.3, 455/418, 420, 502, 550.1, 556.1, 556.2, 557, 455/566, 567, 569.1, 575.2, 575.6; 381/23.1, 381/74, 309–312, 322, 370, 374, 375; 379/428.01, 379/428.02, 430, 431, 433.01, 433.02, 433.03, 379/432

See application file for complete search history.

(56) References Cited

U.S. PATENT DOCUMENTS 6,424,820 B1   7/2002   Burdick et al.

(Continued)

FOREIGN PATENT DOCUMENTS

DE   19645259 A1   5/1998

(Continued)

OTHER PUBLICATIONS

European Search Report dated Jun. 17, 2010; EP Application No. 04012807.6-1246.

*Primary Examiner*—Anthony S. Addy
(74) *Attorney, Agent, or Firm*—Garlick Harrison & Markison (57) ABSTRACT

The modular wireless headset includes at least one wearable earpiece and at least one wearable microphone, where the earpiece is physically separate from the microphone. The wearable earpiece is operably to render inbound radio frequencies received from a host device audible. To do this, the wearable earpiece includes, at least, a receiver module, a data recovery module, and a speaker module. The receiver module is operably coupled to convert the inbound RF signals. The data recovery module is operably coupled to recover audio signals from the RF signals. The speaker module is operably coupled to render the audio signals audible. The wearable microphone is operable to convert received audio signals into outbound RF signals, where the outbound RF signals are transmitted to the host device. The wearable microphone includes, at least, an audio input module and a transmitter module. The audio input module is operably coupled to convert received analog audio signals into digital audio signals. The transmitter module is operably coupled to convert the digital audio signals into the outbound RF signals.

11 Claims, 6 Drawing Sheets

U.S. PATENT DOCUMENTS

| | | |
|---|---|---|
| 7,072,476 B2 * | 7/2006 | White et al. ............... 381/74 |
| 7,233,808 B2 * | 6/2007 | Mooney et al. ............ 455/557 |
| 7,373,182 B2 * | 5/2008 | Zatloukal et al. ......... 455/569.1 |
| 2002/0196955 A1 | 12/2002 | Boesen et al. |
| 2004/0203351 A1 * | 10/2004 | Shearer et al. ............ 455/41.1 |
| 2004/0259538 A1 * | 12/2004 | Agbegnenou ............ 455/422.1 |

FOREIGN PATENT DOCUMENTS

| | | |
|---|---|---|
| DE | 10114109 A1 | 9/2002 |
| EP | 1213896 A1 | 6/2002 |
| WO | WO 02/17564 | 2/2002 |

* cited by examiner

Figure 2 modular wireless headset 30

Figure 10
modular communication device 150

MODULAR WIRELESS HEADSET AND/OR HEADPHONES

CROSS REFERENCES TO RELATED APPLICATIONS

This application is a continuation of and claims priority pursuant to 35 U.S.C. §120 to U.S. patent application having an application Ser. No. 10/856,124, filed May 28, 2004, which is incorporated herein by reference in its entirety. The 10/856,124 application claims priority pursuant to 35 U.S.C §119(e) to a provisionally filed patent application having an application No. 60/473,675, filed May 28, 2003, which is also incorporated herein by reference in its entirety.

BACKGROUND OF THE INVENTION

1. Technical Field of the Invention

This invention generally to wireless communications and more particularly to wireless headset and/or headphone communications.

2. Description of Related Art

Wireless communications offer its users the ability to be "wired" from almost anywhere in the world using cellular telephones, satellite telephones, wireless local area networks, personal digital assistants (PDAs) with radio frequency (RF) interfaces, laptop computers with RF interfaces and other such devices. Such wireless communications have been extended to personal wireless networks, such as the one defined by the Bluetooth specification. One particularly popular use of personal wireless networks is to provide a wireless headset for a cellular telephone, personal computer, laptop, et cetera. The Bluetooth specification provides specific guidelines for providing such wireless headset functionality.

In particular, Bluetooth provides a headset profile that defines protocols and procedures for implementing a wireless headset to a device private network. Once configured, the headset functions as the device's audio input and output. As further defined by the Bluetooth specification, the headset must be able to send AT (ATtention) commands and receive resulting codes, such that the headset can initiate and terminate calls. The Bluetooth specification also defines some headset profile restrictions, which include:

The ultimate headset is assumed to be the only use case active between the two devices;

The transmission of audio is based on continuously variable slope delta (CVSD) modulation. The result is a monophonic audio of a quality that normally will not have perceived audio degradation;

Only one audio connection at a time is supported between the headset and audio gateway;

The audio gateway controls the synchronous connection orientated (SCO) link establishment and release. The headset directly connects and disconnects the internal audio stream upon SCO link establishment and release. Once the link is established, valid speech exists on the SCO link in both directions;

The headset profile offers only basic inoperability such that the handling of multiple calls at the audio gateway is not supported;

It is assumed that the headset user interface can detect user initiated action, such as the pressing of a button.

While a wireless headset provides cord-free operation between the headset and the host device (i.e., the audio gateway), there still must be a physical connectivity between the earpiece and microphone of the headset. Since connectivity limits the physical structure that could be used for a wireless headset and, in many cases, results in headsets that are cumbersome to use and uncomfortable to wear.

Therefore, a need exists for a method and apparatus for a modular headset that is less cumbersome, more discrete, and more comfortable to wear.

BRIEF SUMMARY OF THE INVENTION

The present invention is directed to apparatus and methods of operation that are further described in the following Brief Description of the Drawings, the Detailed Description of the Invention, and the Claims. Features and advantages of the present invention will become apparent from the following detailed description of the invention made with reference to the accompanying drawings.

DETAILED DESCRIPTION OF THE INVENTION

An embodiment of a modular wireless headset includes at least one wearable earpiece and at least one wearable microphone, where the earpiece is physically separate from the microphone. The wearable earpiece is operably to render inbound radio frequencies received from a host device audible. To do this, the wearable earpiece includes, at least, a receiver module, a data recovery module, and a speaker module. The receiver module is operably coupled to convert the inbound RF signals into low intermediate frequency (IF) signals. The data recovery module is operably coupled to recover audio signals from the low IF signals. The speaker module is operably coupled to render the audio signals audible. The wearable microphone is operable to convert received audio signals into outbound RF signals, where the outbound RF signals are transmitted to the host device (e.g., cellular telephone, personal computer, laptop computer, personal digital assistant, wire line telephone, et cetera). The wearable microphone includes, at least, an audio input module and a transmitter module. The audio input module is operably coupled to convert received analog audio signals into digital audio signals. The transmitter module is operably coupled to convert the digital audio signals into the outbound RF signals.

In another embodiment, a method for wireless communications within a piconet that includes a modular wireless headset and a host device begins by establishing a piconet that includes the host device, the earpiece module, and the microphone module. The processing continues by transmitting outbound RF signals from the microphone module to the host device via a $1^{st}$ wireless communication resource of the piconet. The processing further continues by transmitting inbound RF signals from the host device to the earpiece module via a $2^{nd}$ wireless communication resource of the piconet.

An embodiment of a modular communication device includes a host module and a detachable earpiece module. The modular communication device may further include a detachable microphone module. The host module is operable to generate inbound RF signals from playback baseband signals (e.g., digital audio signals produced by a CD player, DVD player, et cetera). The host module provides the playback baseband signals to the detachable earpiece via a physical connection when the detachable earpiece is physically coupled to the host module. The host module provides the inbound RF signals to the detachable earpiece via a wireless communication resource when the detachable earpiece module is not physically coupled to the host module. The host module may receive audio record baseband signals via a physical connection from the microphone module when the microphone module is physically coupled to the host module. When the microphone module is not physically coupled to the host module, the detachable microphone module converts the audio record baseband signals into outbound RF signals and provides the outbound RF signals to the host module via a $2^{nd}$ wireless communication resource.

An embodiment of modular wireless headphones includes a $1^{st}$ wearable earpiece and a $2^{nd}$ wearable earpiece. Each of the wearable earpieces is operably coupled to render inbound signals received from a host device into audible signals. In addition, each of the wearable earpieces includes a receiver module, data recovery module and speaker module. The receiver module is operably coupled to convert the inbound RF signals, which are received from the host device, into low intermediate frequency signals. The data recovery module is operably coupled to recover audio signals from the low intermediate frequency signals. The speaker module is operably coupled to render the audio signals audible. In such an embodiment, the $1^{st}$ wearable earpiece may receive information corresponding to left channel stereo audio information while the $2^{nd}$ wearable earpiece may receive right channel stereo audio information.

Each of these various embodiments provides separate wearable components of a headset and/or headphones. With separate earpieces and/or microphones, various physical embodiments of the earpieces and/or microphones may be generated, the components when worn are less conspicuous than previous integrated headsets and are more comfortable to wear. For instance, the earpieces may be form fitted to an individuals ear, contain an eyeglass clip-on piece, et cetera.

Figure 1:
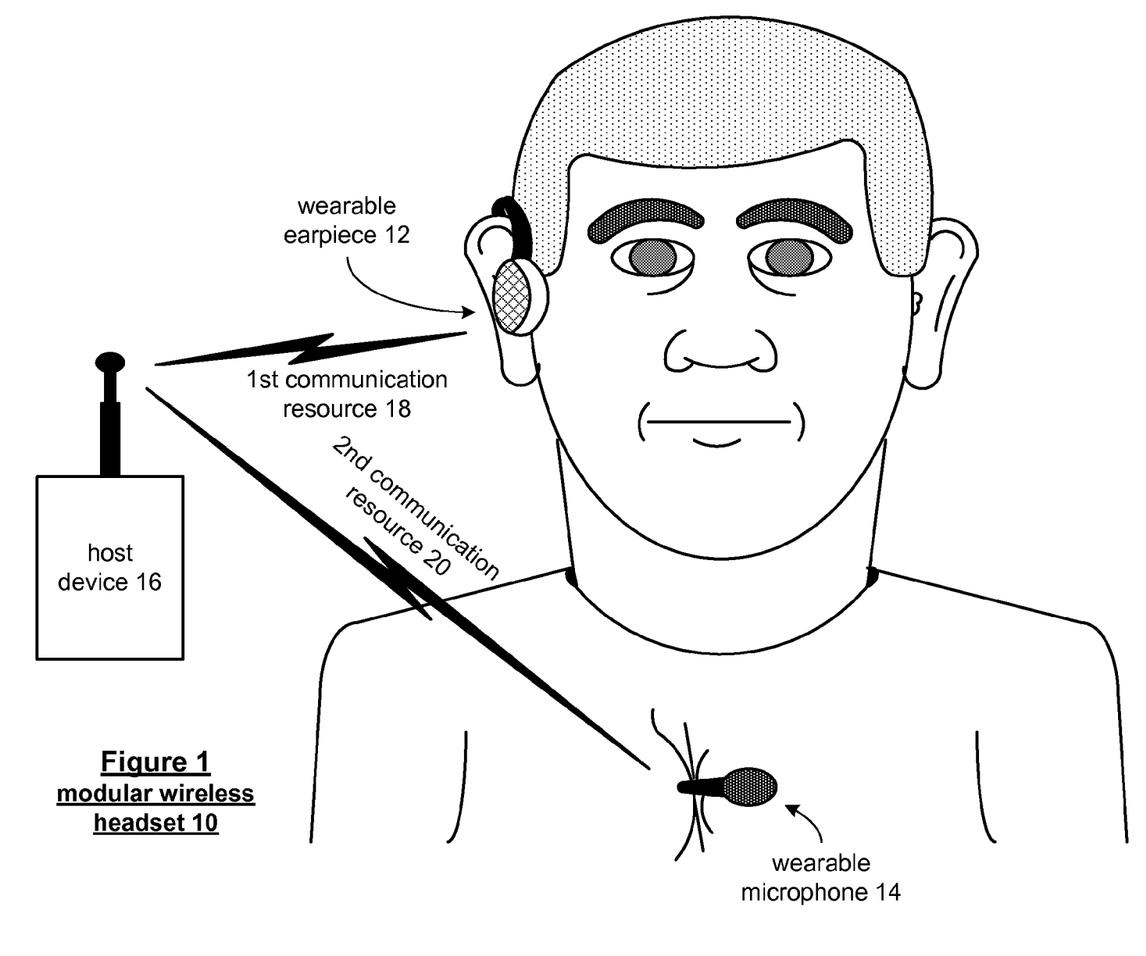
FIG. 1 is a diagram of a modular wireless headset in accordance with the present invention.

FIG. 1 is a diagram of a modular wireless headset 10 that includes a wearable earpiece 12 and a wearable microphone 14. As shown, the wearable earpiece 12 is a separate physical device from the wearable microphone 14. Accordingly, the wearable earpiece 12 and wearable microphone 14 are separate communication devices that communicate with a host device 16 via separate communication resources. As shown, wearable earpiece 12 may communicate with host device 16, which may be a cellular telephone, wire line telephone, laptop computer, personal computer, personal digital assistant, et cetera, via a $1^{st}$ communication resource 18. The wearable microphone 14 may communicate with the host device 16 via a $2^{nd}$ communication resource 20.

If the $1^{st}$ and $2^{nd}$ communication resources 18 and 20 are established in accordance with the Bluetooth specification, the communication resources 18 and 20 may be different timeslot allocations on the same synchronous connection orientated (SCO) link or may be separate SCO links. Configuration details and construction details of the wearable earpiece 12 and wearable microphone 14 will be described in greater detail with reference to FIGS. 3-11.

Figure 2:
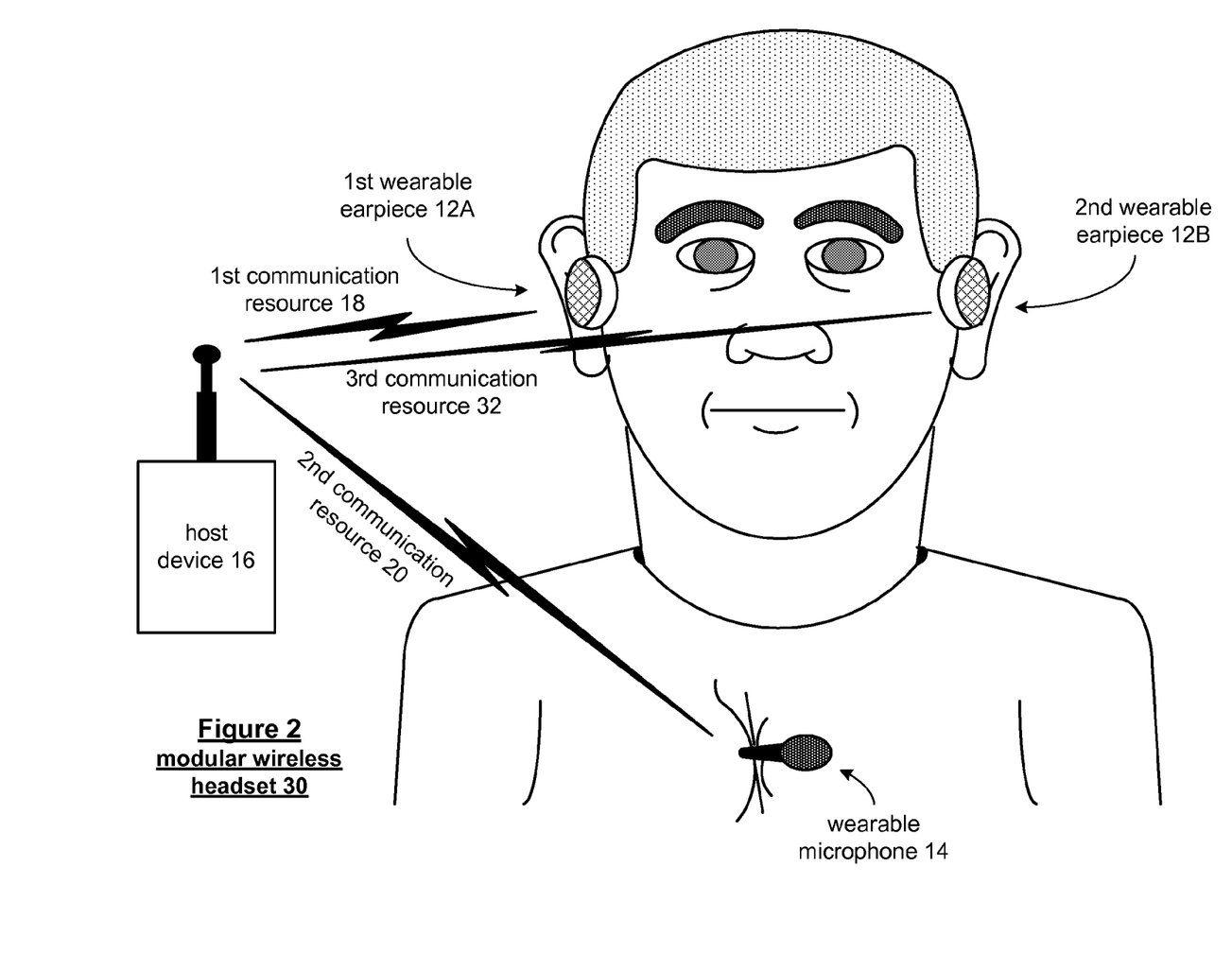
FIG. 2 is a diagram of another modular wireless headset in accordance with the present invention.

FIG. 2 is a diagram of another modular wireless headset 30 that includes two wearable earpieces 12A and 12B and a wearable microphone. In this modular wireless headset configuration, the microphone 14 communicates with the host device 16 via a $2^{nd}$ communication resource 20, the $1^{st}$ wearable earpiece 12A communicates with the host device 16 via a $1^{st}$ communication resource and the $2^{nd}$ wearable earpiece 12B communicates with the host device 16 via a $3^{rd}$ communication resource 32.

In operation, voice produced by the individual wearing the wearable microphone 14 is received via the wearable microphone 14, converted into RF signals and provided to the host device 16 via the $2^{nd}$ communication resource 20. The host device 16 includes a corresponding receiver to recapture the audio signals received from the $2^{nd}$ communication resource 20. In addition, the host device 16 includes at least one transmitter to transmit audio information to the $1^{st}$ and/or $2^{nd}$ wearable earpiece 12A and 12B. In one embodiment, the host device 16 may transmit left channel information to the $1^{st}$ wearable earpiece 12 and right channel stereo information to the $2^{nd}$ wearable earpiece 12B.

A wireless headphone may be generated by omitting the wearable microphone 14 and including only the $1^{st}$ and $2^{nd}$ wearable earpieces 12A and 12B. In this embodiment, the host device 16 will most likely be some type of playback device such as a CD player, DVD player, cassette player, et cetera.

Figure 3:
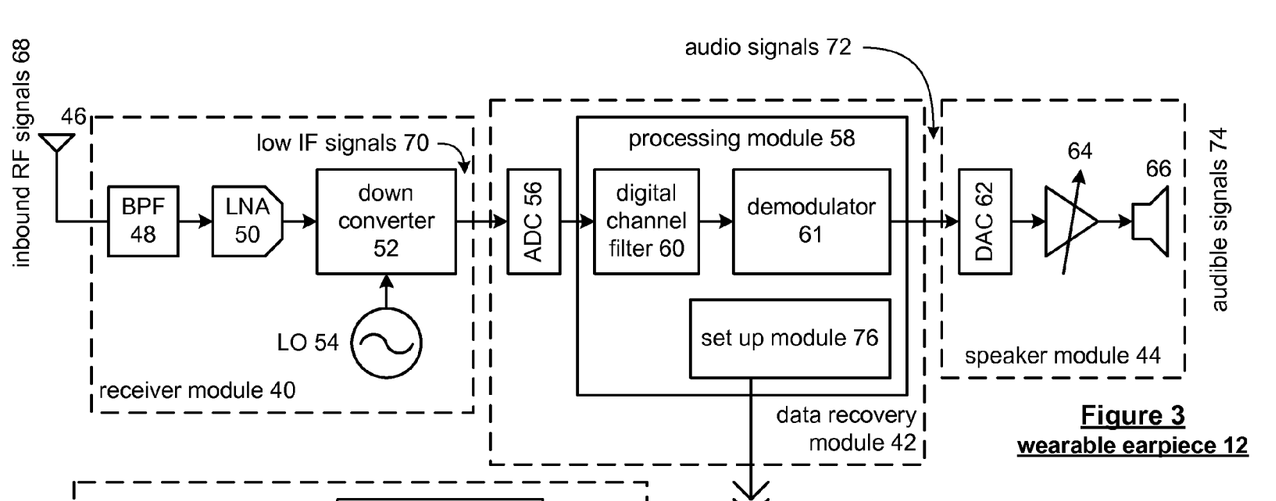
FIG. 3 is a schematic block diagram of a wearable earpiece in accordance with the present invention.

FIG. 3 is a schematic block diagram of a wearable earpiece 12. The wearable earpiece 12 includes a receiver module 40, data recovery module 42 and a speaker module 44. The receiver module 40 includes an antenna 46, bandpass filter 48, low noise amplifier 50, down converter 52 and local oscillator 54. The data recovery module 42 includes an analog-to-digital converter 56 and processing module 58. The processing module 58, which may have associated memory, is configured to provide a digital channel filter 60, demodulator 61 and a setup module 76. The speaker module 44 includes a digital-to-analog converter 62, variable gain module 64, and at least one speaker 66.

Once the piconet is configured (which will be described subsequently), the receiver module 40 receives inbound RF signal 68 from the host device via antenna 46. The bandpass filter 48 filters the received RF signal 68 which are subsequently amplified by the low noise amplifier 50. The down converter 52 converts the filtered and gained RF signal 68 into low intermediate frequency signal 70 based on a local oscillation 54. The low IF signals 70 may have a carrier frequency at DC ranging to a few megahertz.

The data recovery module 42 receives the low intermediate frequency 70 and converts them into digital signals via the analog-to-digital converter 56. The processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The digital channel filter 60 receives the digital low IF signals and filters them. The demodulator 61 recovers audio signals 72 from the filtered low IF signals 70. Note that the generation of the RF signal 68 and subsequent demodulation to recapture the audio signal 72 will generally be done in accordance with a particular wireless communication standard. For example, the Bluetooth specification may be used, IEEE802.11(a), (b), and/or (g) may also be used, et cetera.

The speaker module 44 converts the audio signal 72 into analog signals. The adjustable gain module 64 adjusts the gain (i.e., adjusts volume), and provides the gained signals to the speaker 66, which produces the audible signals 74. As long as the piconet is established between the wearable earpiece 12 and the host device, the wearable earpiece 12 will produce audible signals 74 from received inbound RF signal 68.

Figure 4:
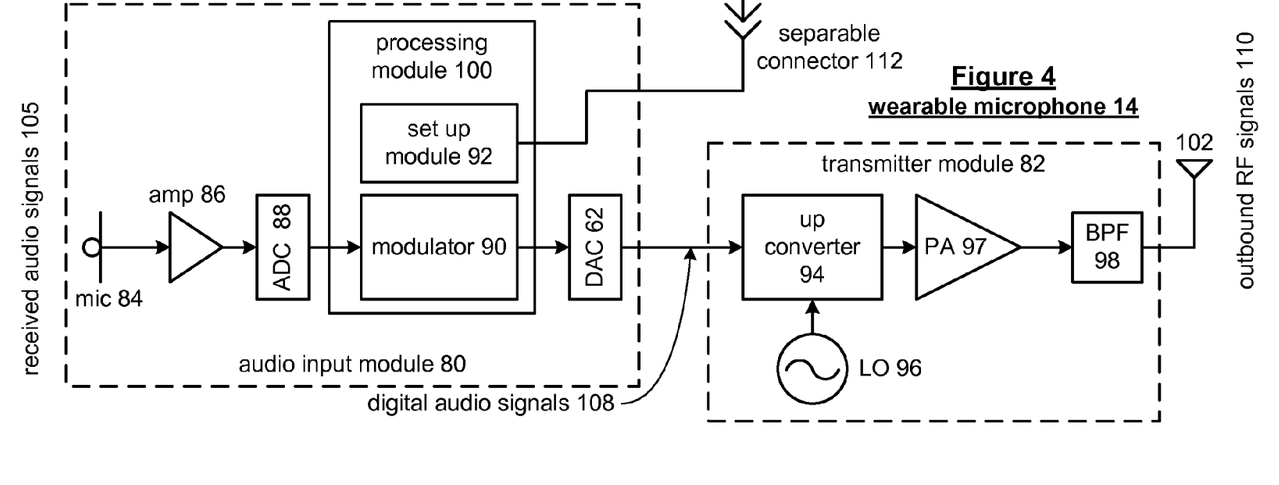
FIG. 4 is a schematic block diagram of a wearable microphone in accordance with the present invention.

FIG. 4 is a schematic block diagram of a wearable microphone 14 that includes an audio input module 80 and a transmitter module 82. The audio input module 80 includes a microphone 84, amplifier 86, analog-to-digital converter 88, processing module 100 that is configured to provide a setup module 92 and modulator 90, and a digital-to-analog converter 62. The transmitter module 82 includes an up-converter 94, a local oscillator 96, a power amplifier 97, a bandpass filter 98, and an antenna 102.

Once the wearable microphone 14 is configured within a piconet (which will be described subsequently), the microphone 84 is operably coupled to receive audio signals 105 and convert them to analog signals. The amplifier 86 amplifies the analog audio signals to produce amplified signals. The analog-to-digital converter 88 converts the amplified signals into digital signals. The modulator 90 modulates the digital signals based on a communication standard into modulated signals. The digital-to-analog converter 62 converts the modulated digital signals into digital audio signals 108. As shown, the modulator 90 and setup module 92 are implemented within processing module 100. The processing module 100 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up-converter 94 converts the digital audio signals 108 into RF signals based on the local oscillation 96. The power amplifier 97 amplifies the signals which are subsequently bandpass filtered by filter 98. The filtered RF signals are then transmitted via antenna 102 as outbound RF signals 110 to the host device. As long as the piconet is established to include the wearable microphone 14 and the host device, the wearable microphone 14 will transmit to the host device in the manner just described.

As shown in both FIGS. 3 and 4, a separable connector 112 couples the setup modules 76 and 92. Such a physical connection allows for the wearable earpiece 12 and wearable microphone 14 to communicate in both directions with the host device to establish the piconet. For example, if the devices are compliant with one or more versions of the Bluetooth specification, the host device, functioning as the master, may issue a piconet request to the wearable earpiece coupled to the wearable microphone 14. Upon receiving this request, the wearable earpiece and wearable microphone respond to the request indicating that a receive RF channel be setup for the wearable earpiece and a transmit RF channel be setup for the wearable microphone. Based on these responses, the master coordinates the establishment of the piconet and provides synchronization information through the wearable earpiece and wearable microphone via the receiver module 40 of earpiece 12. The setup modules 76 and 92 coordinate the synchronization of the earpiece 12 and microphone 14 with the host device as well as coordinating timeslot assignments and/or SCO link assignments. Once the piconet has been established in this manner, the separable connector 112 is broken such that the wearable earpiece 12 and wearable microphone are separate pieces.

As an alternative setup mode, the wearable earpiece 12, wearable microphone 14 may be directly coupled to the host device. The direct coupling may be used to establish the piconet and exchange synchronization information, timeslot allocation information, et cetera. Once the information has been exchanged in this manner, the connections may be broken such that the wearable earpiece 12, wearable microphone 14 and host device 16 are physically separate devices.

Figure 5:
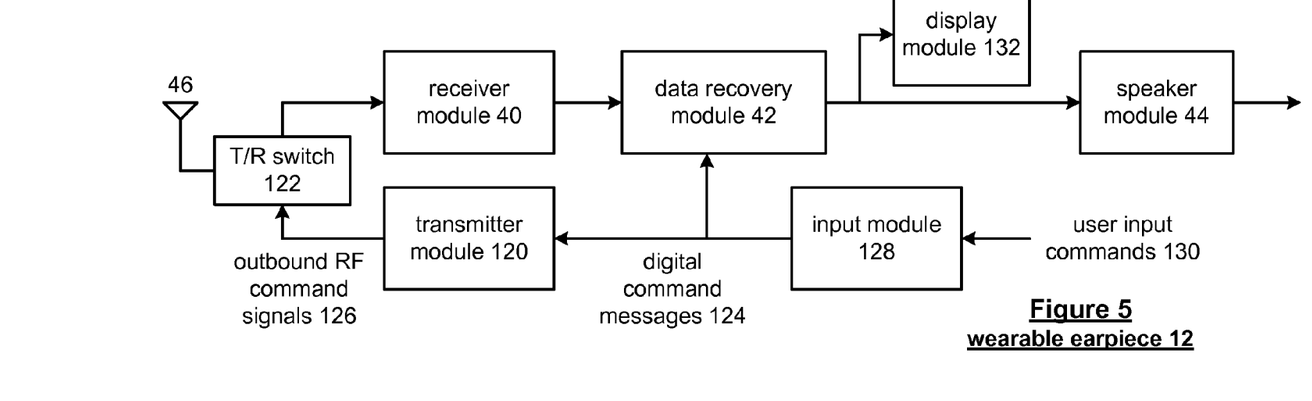
FIG. 5 is a schematic block diagram of an alternate wearable earpiece in accordance with the present invention.
Figure 6:
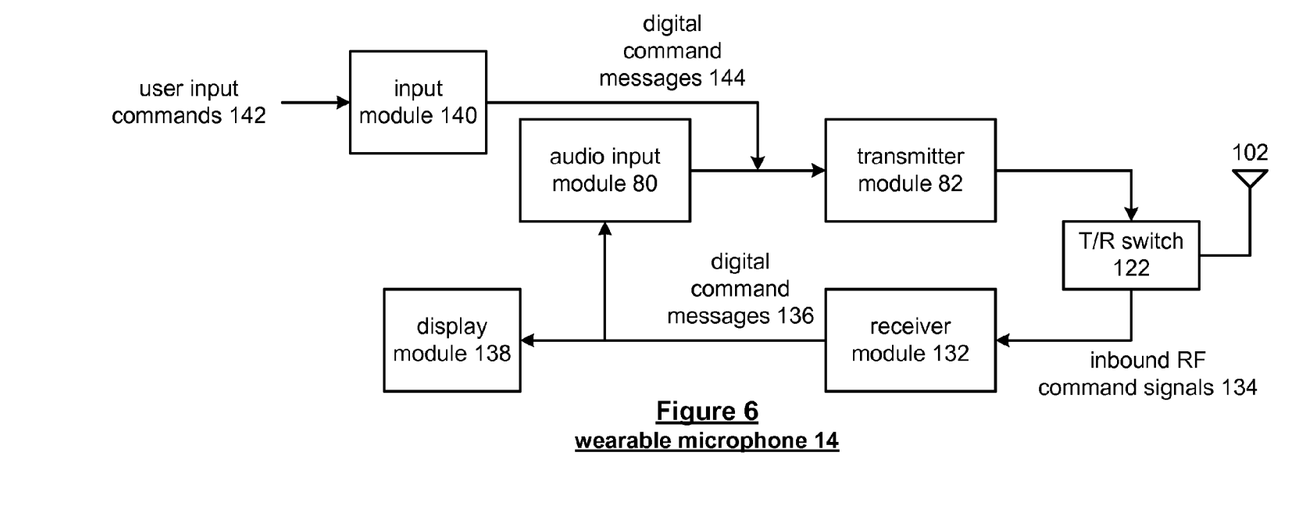
FIG. 6 is a schematic block diagram of another wearable microphone in accordance with the present invention.

FIGS. 5 and 6 illustrate schematic block diagrams of a wearable earpiece 12 and wearable microphone 14 that include transceiver modules (i.e., receiver modules and transmitter modules). With the use of the transceiver modules, the wearable earpiece 12, wearable microphone 14 and host device 16 may be physically separate devices and configure the piconet utilizing RF communications. As such, the wearable earpiece 12, the wearable microphone 14 may be continuously worn on a person for receiving incoming calls and/or placing outgoing calls.

The wearable earpiece 12, as shown in FIG. 5, includes the antenna 46, a transmit/receive switch 122, receiver module 40, data recovery module 42, speaker module 44, transmitter module 120, input module 128 and display module 132. Receiver module 40, data recovery module 42 and speaker module 44 operate as discussed with reference to FIG. 3 with the exception of the data recovery module 42 producing display information that is provided to the display module 132. For instance, the received RF signal may include display information such as caller ID, command information, et cetera that is separated by the data recovery module 42 and provided to display module 132, which may be an LCD display, plasma display, et cetera.

The input module 128, which may be a keypad, touch screen, voice recognition circuit, et cetera, receives user input commands 130 and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

The data recovery module 42 receives the digital command messages 124 and, when applicable, processes the command messages. For example, if the command message is with respect to a volume adjust; a graphical representation of adjusting the volume may be presented on display module 132.

The transmit module 120 receives the digital command messages 124 and converts them into outbound RF command signals 126 which are subsequently transmitted to the host and/or microphone module via antenna 46. Accordingly, by including the transmitter module 120 along with receiver module 40, the wearable earpiece 12 may function as a master and/or slave within the piconet and exchange data with the other elements (e.g., the host and/or microphone) within the piconet.

FIG. 6 is a schematic block diagram of a wearable microphone 14 that includes the audio input module 80, transmitter module 82, transmit receive switch 122, antenna 102, receiver module 132, input module 140 and display module 138. The input module 140 is operably coupled to receive user input commands 142 and convert them into digital command messages 144. The digital command messages may be similar to the digital command messages 124 and may further include establish a call, terminate a call, et cetera. The transmitter module 82 converts the digital command messages 144 into RF command signals 134 that are transmitted via antenna 102. The display module 138, which may be a LCD display, plasma display et cetera receives digital command messages 136 and may display corresponding configuration messages. In addition, any display information received from the host and/or microphone module regarding setup, operation, or as part of the data content, may be displayed on the display module 138.

Figure 7:
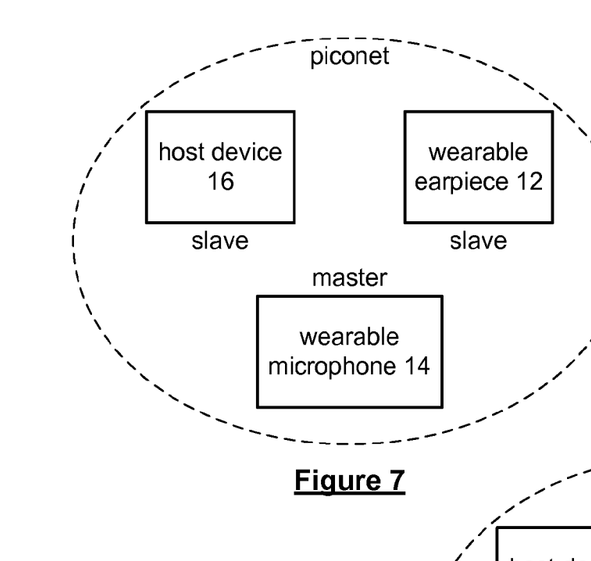
FIGS. 7-9 are graphic representations of various piconets that include a modular wireless headset and host device in accordance with the present invention.
Figure 8:
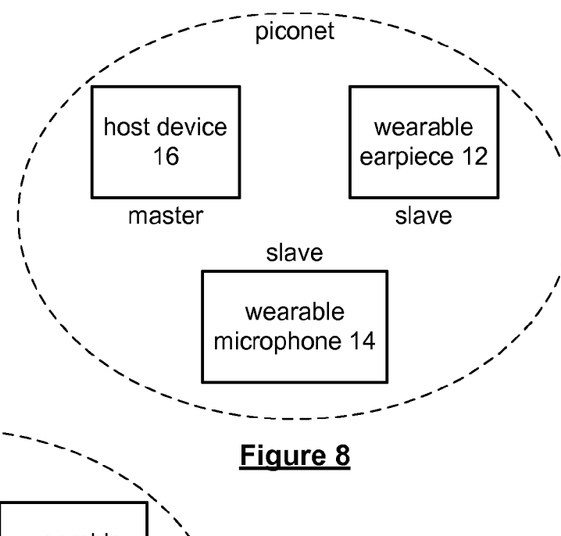
Figure 9:
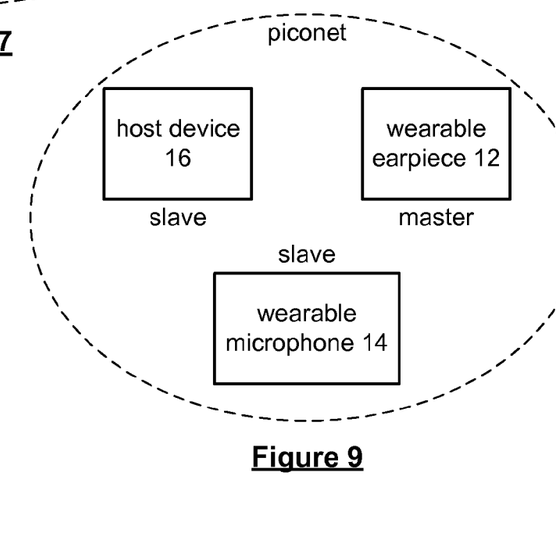

FIGS. 7-9 illustrate various configurations for the piconet. As shown, in each of the FIGS. 7-9, the piconet includes the host device 16, wearable earpiece 12 and wearable microphone 14. In FIG. 7, the wearable microphone 14 functions as the master such that, as the master, the wearable microphone 14 establishes and breakdowns the piconet, provides synchronization information and perform timeslot allocations and/or establish multiple SCO links with the host device 16 and wearable earpiece 12. In FIG. 8 the host device 16 has master responsibilities and in FIG. 9 the wearable earpiece 12 has master responsibilities. As such, by configuring the wearable earpiece 12 and wearable microphone 14 as discussed in FIGS. 5 and 6, the wearable earpiece 12 and wearable microphone 14 may be completely physically separate devices from each other and from the host device. Alternatively, as discussed with reference to FIGS. 3 and 4, the wearable earpiece and wearable microphone may be physically coupled to establish the piconet. Once the piconet is established, the devices are physically separated and communicate with the host device 16 via separate RF communication resources.

Figure 10:
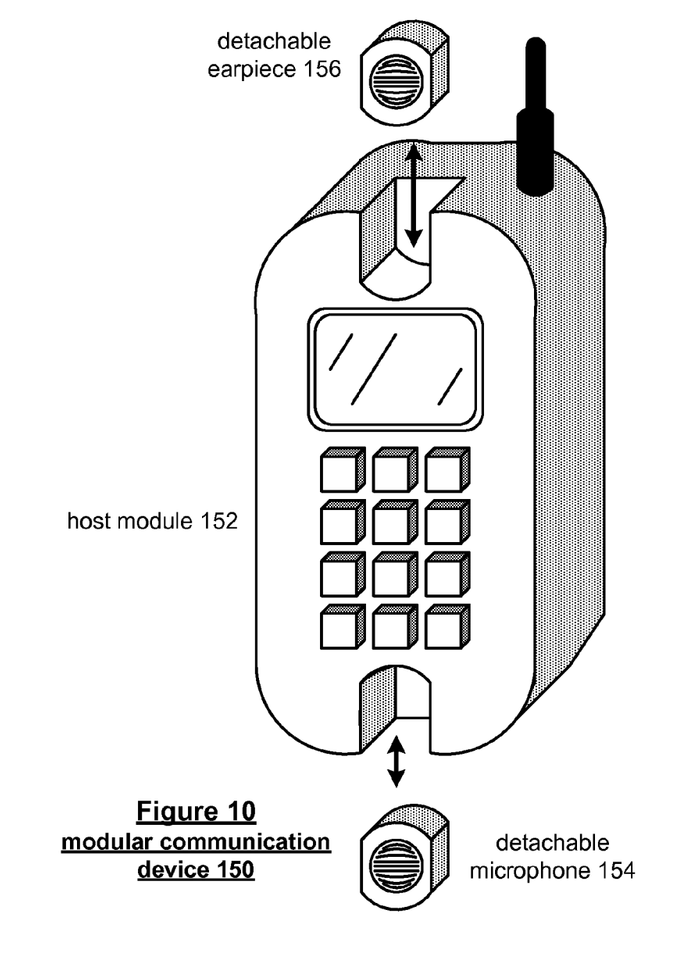
FIG. 10 is a diagram of a modular communication device in accordance with the present invention.

FIG. 10 is a schematic block diagram of a modular communication device 150 that includes a host module 152, detachable microphone 154 and detachable earpiece 156. In this embodiment, the modular communication device 150 may function as a typical device (e.g., cellular telephone, CD player, cassette player, et cetera) when the detachable earpiece 156 and detachable microphone 154 are physically connected to the host module 152. The detachable earpiece may be configured as shown in FIG. 3 or in FIG. 5 and the detachable microphone may be configured as shown in FIG. 4 or FIG. 6. As such, when the detachable earpiece 156 is not in physical contact with the host module 152, it communicates with the host module 152 via an RF communication resource. Similarly, when the detachable microphone 154 is detached from the host module 152, it communicates via a RF communication resource. Alternatively, when the detachable earpiece 156 and/or the detachable microphone 154 are physically coupled to the host module 152, they communicate via a physical link. As one of average skill in the art will appreciate, the modular communication device 150 may include multiple detachable earpieces 156. In addition, the modular communication device 150 may omit the detachable microphone 154 if the host device 152 is a playback type device (e.g., DVD player, CD player, cassette player, et cetera).

Figure 11:
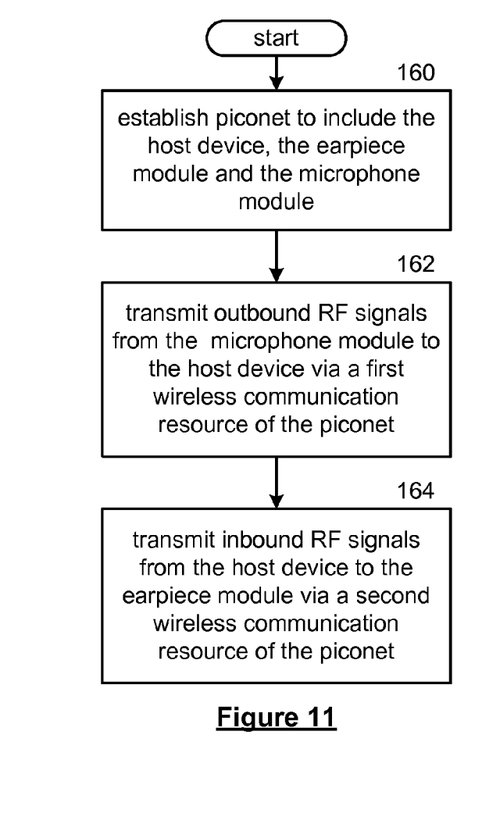
FIG. 11 is a logic diagram of a method for wireless communications within a piconet that includes a modular wireless headset and host device in accordance with the present invention.

FIG. 11 is a logic diagram of a method for wireless communications within a piconet that includes a modular wireless headset and a host device. The process begins at Step 160 where the piconet is established to include the host device, the earpiece module and the microphone module. This may be done in a variety of ways. For instance, the piconet may be established by exchanging configuration information via a physical connection between the host device, the earpiece module and the microphone module prior to any RF transmissions there between. Based on the configuration information, the piconet is configured and the devices are separated. Once separated RF communications may commence. Alternatively, the piconet may be established by exchanging configuration information via $1^{st}$ and $2^{nd}$ wireless communication resources that exist between the host device, the earpiece module and the microphone module prior to data content being transmitted via the communication resources. Once the configuration information is exchanged, the piconet is established and data content RF transmissions may commence.

The process then proceeds to Step 162 where outbound RF signals are transmitted from the microphone module to the host device via a $1^{st}$ wireless communication resource of the piconet. Simultaneously or in a half-duplex mode, Step 164 occurs where inbound RF signals are transmitted from the host device to the earpiece module via a $2^{nd}$ wireless communication resource of the piconet. The communication resources may be different timeslots on the same SCO link or different SCO links. The earpiece module may be configured to block or receive the outbound RF signals transmitted by the microphone module. Such a selection may be user controlled.

The preceding discussion has presented a modular communication device, modular wireless headset and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. An apparatus comprising:
   a first wearable earpiece to operate in conjunction with a host device, in which when there is a first physical connection between the first wearable earpiece and the host device, a first communication link is established between the host device and the first wearable earpiece through the first physical connection, but when the first wearable earpiece is detached from the host device, the first communication link between the host device and the first wearable earpiece is established through a first wireless connection, the first wearable earpiece including a first radio frequency (RF) circuitry to establish the first wireless connection;

a second wearable earpiece to operate in conjunction with the host device, in which when there is a second physical connection between the second wearable earpiece and the host device, a second communication link is established between the host device and the second wearable earpiece through the second physical connection, but when the second wearable earpiece is detached from the host device, the second communication link between the host device and the second wearable earpiece is established through a second wireless connection, the second wearable earpiece including a second RF circuitry to establish the second wireless connection, in which the second wearable earpiece is physically separate from the first wearable earpiece and the two earpieces provide left and right stereo channel audio signals; and a wearable microphone to operate in conjunction with the host device and the wearable earpieces, in which when there is a third physical connection between the wearable microphone and the host device, a third communication link is established between the host device and the wearable microphone through the third physical connection, but when the wearable microphone is detached from the host device, the third communication link between the host device and the wearable microphone is established through a third wireless connection, the wearable microphone including a third RF circuitry to establish the third wireless connection, and wherein the first, second and third communication links are synchronized for synchronized communication between the host device and the wearable earpieces and between the host device and the wearable microphone by utilizing different channels of a piconet, when the wearable earpieces and the wearable microphone are not physically connected to each other when operating in a wireless mode.

2. The apparatus of claim 1, wherein the first RF circuitry and the second RF circuitry send digital command messages to the host device.

3. The apparatus of claim 2, wherein the digital command messages include at least one of packet size, synchronization information, frequency hopping initiation information, time slot allocation information, link establishment information, and piconet address information.

4. The apparatus of claim 1, wherein one of the wearable earpieces also includes a display for displaying information.

5. The apparatus of claim 1, wherein the wearable microphone includes a display for displaying information.

6. The apparatus of claim 1, wherein the third RF circuitry sends digital command messages to the host device.

7. The apparatus of claim 1, wherein the piconet is established using one or more versions of a Bluetooth specification.

8. A method comprising:
determining whether a first physical connection exists between a host device and a first wearable earpiece that operates in conjunction with the host device;

establishing a first communication link between the host device and the first wearable earpiece through the first physical connection when the first physical connection is present;

establishing the first communication link between the host device and the first wearable earpiece through a first wireless connection when the first wearable earpiece is detached from the host device and the first physical connection is not present, wherein the first wireless connection is established by a first radio frequency (RF) circuitry;

determining whether a second physical connection exists between a host device and a second wearable earpiece that operates in conjunction with the host device;

establishing a second communication link between the host device and the second wearable earpiece through the second physical connection when the second physical connection is present;

establishing the second communication link between the host device and the second wearable earpiece through a second wireless connection when the second wearable earpiece is detached from the host device and the second physical connection is not present, wherein the second wireless connection is established by a second RF circuitry, in which the second wearable earpiece is physically separate from the first wearable earpiece and the two earpieces provide left and right stereo channel audio signals;

determining whether a third physical connection exists between the host device and a wearable microphone that operates in conjunction with the host device;

establishing a third communication link between the host device and the wearable microphone through the third physical connection when the third physical connection is present;

establishing the third communication link between the host device and the wearable microphone through a third wireless connection when the wearable microphone is detached from the host device and the third physical connection is not present, wherein the third wireless connection is established by a third RF circuitry; and synchronizing the first, second and third communication links for synchronized communication between the host device and the wearable earpieces and between the host device and the wearable microphone by utilizing different channels of a piconet, when the wearable earpieces and the wearable microphone are not physically connected to each other when operating in a wireless mode.

9. The method of claim 8, wherein the synchronizing includes using a time slot of a Bluetooth compliant piconet for the first communication link and different time slots of the Bluetooth compliant piconet for the second and third communication links when in the wireless mode.

10. The method of claim 8, further including displaying information on a display attached to the wearable earpiece.

11. The method of claim 8, further including displaying information on a display attached to the wearable microphone.

* * * * *